United States Patent Office 3,281,412
Patented Oct. 25, 1966

3,281,412
CHEMICAL COMPOUNDS
Harry L. Yale, New Brunswick, and Josef Fried, Princeton, N.J., assignors, by mesne assignments, to E. R. Squibb & Sons, Inc., New York, N.Y., a corporation of Delaware
No Drawing. Filed July 24, 1962, Ser. No. 212,152
9 Claims. (Cl. 260—239)

This invention relates to, and has for its object the provision of a class of new sulfinyl ureas having utility as hypoglycemic agents and as intermediates in the preparation of other useful compounds.

This application is a continuation-in-part of a previous application, Serial No. 5,350, filed January 29, 1960, now abandoned.

More particularly, this invention relates to compounds of the general formula

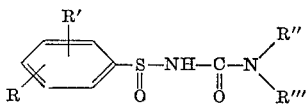

wherein R is lower alkyl (e.g., methyl, ethyl, propyl, isopropyl, n-butyl and tert-butyl), cycloalkyl (e.g., cyclohexyl), halogen of atomic weight greater than ten (e.g., chloro and bromo), halogenated lower alkyl (e.g., dichloromethyl and difluoromethyl), nitro, amino, lower alkoxy (e.g., methoxy) or the acyl radical of a hydrocarbon carboxylic acid of less than five carbon atoms (e.g., acetyl and propionyl); R' is hydrogen, chlorine, bromine, nitro, cyclohexyl, cyclopentyl, amino or lower alkoxy; R'' is lower alkyl (e.g., methyl, ethyl, propyl, isopropyl, butyl, tert-butyl and amyl), cycloalkyl (e.g., cycohexyl), or azacycloalkyl (e.g., hexamethyleneimino); and R''' is hydrogen or R'' and the pharmaceutically acceptable metal salts thereof, such as, alkali metals (e.g., sodium salts and potassium) and alkaline earth metal (e.g., calcium and barium).

In the most preferable embodiments of this invention R is dichloromethyl, trifluoromethyl, acetyl, and R', R'' and R''' are as hereinbefore defined; however, the other compounds of this invention also yield satisfactory results.

Among the compounds of this invention there can be named inter alia: 1-lower alkyl-3-(p-lower alkylbenzenesulfinyl)ureas (e.g., 1 - tert - butyl - 3 - (p-methylbenzenesulfinyl)ureas; and its sodium salt); 1-lower alkyl-3-(3,4-di-lower alkylbenzenesulfinyl)ureas (e.g., 1-butyl-3-(3,4 - dimethylbenzenesulfinyl) urea); 1 - lower alkyl - 3-(halogenated-lower alkylbenzenesulfinyl)ureas (e.g., 1-propyl-3-(p-trifluoromethylbenzenesulfinyl)urea) and 1-tert-butyl - 3 - (p - dichloromethylbenzenesulfinylurea); 1-cycloalkyl-3-(p-lower alkylbenzenesulfinyl)ureas (e.g., 1-cyclohexyl - 3 - (p-methylbenzenesulfinyl)urea and its sodium salt); 1,1-di-lower alkyl-3-(dihalobenzenesulfinyl) ureas (e.g., 1,1-diethyl-3-(3,4-dichlorobenzenesulfinyl) urea and its calcium salt); 1-lower-alkyl-3-(aminobenzenesulfinyl)ureas (e.g., 1 - tert-butyl - 3 - (p-aminobenzenesulfinyl)urea and its barium salt); 1-lower alkyl-3-(3-amino-4-lower alkylbenzenesulfinyl)ureas (e.g., 1-tert-butyl-3-(3 - amino-p-methylbenzenesulfinyl)urea and its sodium salt); 1-cycloalkyl-3-(halobenzenesulfinyl) ureas (e.g., 1 - cyclohexyl - 3 - (p-chlorobenzenesulfinyl) urea); 1-cycloalkyl-3-(alkoxybenzenesulfinyl)ureas (e.g., 1-cyclopentyl-3-(p-methoxybenzenesulfinyl)urea); and 1-cycloalkyl-3-(halo-lower-alkylbenzenesulfinyl)ureas (e.g., 1-cyclohexyl-3-(p-dichloromethylbenzenesulfinyl)urea) or 1-cyclohexyl-3-(p-trifluoromethylbenzenesulfinyl)urea; 1-azacycloalkyl-3-(acylbenzenesulfinyl)urea (e.g., 1-hexamethyleneimino-3-(4-acetylbenzenesulfinyl)urea).

The compounds of this invention can be prepared by a method which comprises reacting an asymmetrically substituted urea of the formula:

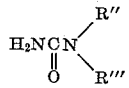

wherein R'' and R''' are as hereinbefore defined, with an arylsulfinyl halide of the formula:

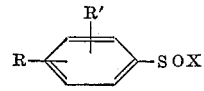

wherein R and R' are as hereinbefore defined and X is a halogen of atomic weight greater than 10. The reaction is conducted in an organic reaction medium, preferably one which will act as an acid acceptor. Among the reaction media may be named the organic bases such as pyridine, quinoline and N-methylmorpholine. The reaction proceeds at room temperature without heating but can also be conducted at elevated temperature. After the reaction is completed, the products can be separated from the reaction mixture by treatment with an acid, and then extraction of the acid insoluble material with aqueous alkali. Further purification of the product which precipitates by acidification of the aqueous alkaline extracts, can be accomplished, if desired, using conventional purification procedures. Metal salts can be prepared by treatment of the product with a metal hydroxide and concentration of the reaction mixture in vacuo to yield the desired salt.

The compounds of this invention are pharmacologically active compounds useful as such, in the treatment of hyperglycemia, for which purpose they can be administered orally in the usual pharmaceutically acceptable formulations; or they may be used as intermediates for the preparation of their respective sulfonyl urea analogs, which latter compounds are likewise useful in the treatment of hyperglycemia. For this purpose, the compounds of this invention are readily converted to compounds of the formula:

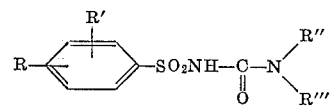

wherein R, R', R'' and R''' are as hereinbefore defined, by treatment with an oxidation reagent such as potassium permanganate in aqueous solution.

The following examples are presented to more fully illustrate this invention (all temperatures being in centigrade):

EXAMPLE 1

1-tert-butyl-3-(p-methylbenzenesulfinyl)urea

To a stirred partial solution of 5.8 g. of tert-butylurea in 100 ml. of pyridine is added in an atmosphere of dry nitrogen, at room temperature, 8.7 g. of p-methylbenzenesulfinyl chloride. The homogenous reaction mixture is allowed to stand about 10 minutes and then poured into a mixture of 125 ml. of concentrated hydrochloric acid, 300 ml. of water and 300 g. of ice. The material which separates is triturated in 10% aqueous hydrochloric acid and then extracted successively with 75 ml. of 5% NaOH at 30° and 50 ml. of 2.5% NaOH at 50°. The extracts are combined, clarified, cooled and the pH adjusted to four to give about 4.1 g. of crude product, M.P. about 143–146°. After three recrystallizations from 50% acetonitrile, there is obtained 1 g. of 1-tert-butyl-3-(p-methylbenzenesulfinyl)urea, M.P. about 152–153°.

EXAMPLE 2

1-n-butyl-3-(3,4-dimethylbenzenesulfinyl)urea (A) To 179 g. of thionyl chloride is gradually added 38.4 g. of 3,4-dimethylbenzenesulfinic acid, sodium salt and the reaction mixture stirred for two hours. The excess thionyl chloride is then removed in vacuo and the acid chloride extracted with ether. The ether extract is then concentrated and the residual oil distilled in vacuo to give 3,4-dimethylbenzenesulfinyl chloride.

(B) Following the method of Example 1 but using 11.6 g. of n-butylurea and 18.8 g. of 3,4-dimethylbenzenesulfinyl chloride, there is obtained 1-n-butyl-3-(3,4-dimethylbenzenesulfinyl)urea.

EXAMPLE 3

1-propyl-3-(p-trifluoromethylbenzenesulfinyl)urea (A) To a stirred mixture of 248 g. of p-trifluoromethylbenzenesulfonic acid, sodium salt and 25 ml. of dimethylformamide in a reaction flask equipped for distillation, is added, dropwise, 262 g. of thionyl chloride. When the initially vigorous reaction subsides, the mixture is heated to 90° for ½ hour and stirred an additional ½ hour at the same temperature. The excess thionyl chloride is then removed in vacuo and the cooled residue extracted with ether. The ether extract containing the acid chloride is washed with water and then aqueous sodium bicarbonate solution until the washings are neutral and dried. The ether is then removed by distillation to give p-trifluoromethylbenzenesulfonyl chloride, M.P. 28–30°.

(B) To a vigorously stirred suspension of 100 g. of zinc dust in 1 l. of water at 70° is added in small portions 159 g. of finely divided p-trifluoromethylbenzenesulfonyl chloride. After stirring for an additional 10 minutes, the reaction mixture is heated to 90°. Then 62 ml. of 50% NaOH is added followed by a sodium carbonate in small portions until the reaction becomes strongly alkaline. The mixture is then filtered with suction. The filtrate is concentrated in vacuo to one-quarter of its original volume and cooled. The p-trifluoromethylbenzenesulfinic acid, sodium salt which separates is filtered and dried.

(C) Using in place of the 3,4-dimethylbenzenesulfinic acid, sodium salt, 47.8 g. of p-trifluoromethylbenzenesulfinic acid, sodium salt in the procedure described in Example 2 for 3,4-dimethylbenzenesulfinyl chloride, there is obtained p-trifluoromethylbenzenesulfinyl chloride.

(D) By the substitution of 11.4 g. of p-trifluoromethylbenzenesulfinyl chloride for the p-methylbenzenesulfinylchloride and 5.1 g. of n-propylurea for n-butylurea in the procedure in Example 1, there is obtained 1-propyl-3-(p-trifluoromethylbenzenesulfinyl)urea.

EXAMPLE 4

1-cyclohexyl-3-(p-methylbenzenesulfinyl)urea

By replacing the t-butylurea in the procedure of Example 1 with 7.1 g. of cyclohexylurea, there is obtained 1-cyclohexyl-3-(p-methylbenzenesulfinyl)urea.

EXAMPLE 5

1,1-diethyl-3-(3,4-dichlorobenzenesulfinyl)urea (A) By using 249 g. of 3,4-dichlorobenzenesulfonic acid, sodium salt in place of p-trifluoromethylbenzenesulfonic acid, sodium salt in the procedure described in Example 3 for the preparation of p-trifluoromethylbenzenesulfonyl chloride, there is obtained 3,4-dichlorobenzenesulfonyl chloride.

(B) The substitution of 160 g. of the above 3,4-dichlorobenzenesulfonyl chloride for the p-trifluoromethylbenzenesulfonyl chloride in Example 3B, gives 3,4-dichlorobenzenesulfinic acid, sodium salt.

(C) Following the procedure in Example 2A, the 3,4-dimethylbenzenesulfinic acid, sodium salt with 46.4 g. of 3,4-dichlorobenzenesulfinic acid, sodium salt, there is obtained 3,4-dichlorobenzenesulfinyl chloride.

(D) By the substitution of 11.45 g. of the 3,4-dichlorobenzenesulfinyl chloride obtained above for the 3,4-dimethylbenzenesulfinylchloride and diethylurea for n-butylurea in the method described in Example 1, there is obtained 1,1-diethyl-3-(3,4-dichlorobenzenesulfinyl)urea.

EXAMPLE 6

1-tert-butyl-3-(p-aminobenzenesulfinyl)urea (A) By the substitution of 41.8 g. of p-nitrobenzenesulfinic acid, sodium salt for 3,4-dimethylbenzenesulfinic acid sodium salt in Example 2A, there is obtained p-nitrobenzenesulfinylchloride.

(B) By replacing the p-methylbenzenesulfinyl chloride in Example 1 with 10.2 g. of p-nitrobenzenesulfinyl chloride, there is obtained 1-tert-butyl-3(p-nitrobenzenesulfinyl)urea.

(C) The 1-tert-butyl - 3 - (p-nitrobenzenesulfinyl)urea thus prepared is reduced by heating it in a 20% aqueous ammonium sulfide at 90° until the original orange-red color changes to a pale yellow. After filtration and acidification of the filtrate, there is obtained 1-tert-butyl-3-(p-aminobenzenesulfinyl)urea.

EXAMPLE 7

1-tert-butyl-3-(3-amino-p-methylbenzenesulfinyl)urea (A) By using 44.6 g. of 3-nitro-p-methylbenzenesulfinic acid, sodium salt in place of the 3,4-dimethylbenzenesulfinic acid, sodium salt in Example 2A, there is obtained 3-nitro-p-methylbenzenesulfinyl chloride.

(B) By the substitution of 21.9 g. of 3-nitro-p-methylbenzenesulfinyl chloride for the p-methylbenzenesulfinyl chloride in Example 1, there is obtained 1-tert-butyl-3-(3-nitro-p-methylbenzenesulfinyl)urea.

(C) The replacement of the 1-tert-butyl-3-(p-nitrobenzenesulfinyl)urea in Example 6C with the 1-tert-butyl - 3 - (3-nitro-p-methylbenzenesulfinyl)urea gives 1-tert-butyl-3-(3-amino-p-methylbenzenesulfinyl)urea.

EXAMPLE 8

1-cyclohexyl-3-(p-chlorobenzenesulfinyl)urea (A) By the substitution of 39.6 g. of p-chlorobenzenesulfinic acid, sodium salt for 3,4-dimethylbenzenesulfinic acid, sodium salt in Example 2A, there is obtained p-chlorobenzenesulfinyl chloride.

(B) By replacing tert-butylurea with 7.1 g. of cyclohexylurea and using 9.7 g. of p-chlorobenzenesulfinyl chloride in the place of p-methylbenzenesulfinyl chloride in Example 1, there is obtained 1-cyclohexyl-3-(p-chlorobenzenesulfinyl)urea.

EXAMPLE 9

1-n-butyl-3-(p-methylbenzenesulfinyl)urea

To a stirred solution of 11.2 g. of n-butylurea in 80 ml. of pyridine maintained in an atmosphere of dry nitrogen is added in one portion 16.9 g. of p-methylbenzenesulfinyl chloride and the mixture is allowed to stand. After 10 minutes the reaction is slowly stirred into a mixture of 100 ml. of concentrated hydrochloric acid, 300 ml. of water, and 300 g. of crushed ice. The white solid which separates is filtered, washed with dilute hydrochloric acid and stirred for 15 minutes with two successive 100 ml. portions of 5% sodium hydroxide. The alkaline extracts are combined and cooled (0°). Upon acidification (pH 4) by dropwise addition of concentrated hydrochloric acid and two recrystallizations by dissolution in boiling ethanol (5 ml./g.) and addition of an equal volume of boiling water, there is obtained 10.0 g. of pure 1-n-butyl-3-p-methylbenzenesulfinylurea, M.P. about 136–137°.

EXAMPLE 10

1-cyclopentyl-3-(p-methoxybenzenesulfinyl)urea (A) The substitution of 38.8 g. of p-methoxybenzenesulfinic acid, sodium salt for 3,4-dimethylbenzenesulfinic acid, sodium salt in Example 2A gives p-methoxybenzenesulfinyl chloride.

(B) To a stirred suspension of 105 g. of nitrourea is added dropwise 85.1 g. of cyclopentylamine. The reaction mixture is warmed, as rapidly as foaming permits, to reflux, and then heated under reflux for one hour. The solution is then clarified, concentrated to a small volume and cooled to give cyclopentylurea.

(C) By replacing tert-butylurea with 6.4 g. of cyclopentylurea and by substituting for p-methylbenzenesulfinyl chloride 9.5 g. of p-methoxybenzenesulfinyl chloride in Example 1, there is obtained 1-cyclopentyl-3-(p-methoxybenzenesulfinyl)urea.

EXAMPLE 11

*1-cyclohexyl-3-(p-dichloromethylbenzenesulfinyl)urea*

(A) By the substitution of p-dichloromethylbenzenesulfinic acid, sodium salt for 3,4-dimethylbenzenesulfinic acid, sodium salt in Example 2A, there is obtained p-dichloromethylbenzenesulfinyl chloride.

(B) By replacing tert-butylurea with cyclohexyl urea and employing p-dichloromethylbenzenesulfinyl chloride in place of p-methylbenzenesulfinyl chloride in Example 1, there is obtained 1-cyclohexyl-3-(p-dichloromethylbenzenesulfinyl)urea.

EXAMPLE 12

*1-(hexamethyleneimino)-3-(p-acetylbenzenesulfinyl)urea*

(A) Following the procedure of Example 3 but substituting 150 g. of p-acetylbenzenesulfonyl chloride for the p-trifluoromethylbenzenesulfonyl chloride, there is obtained p-acetylbenzenesulfinic acid, sodium salt.

(B) Using 42.3 g. 4-acetylbenzenesulfinic acid, sodium salt, in place of the 3,4-dimethylbenzenesulfinic acid, sodium salt in Example 2, there is obtained 4-acetylbenzenesulfinyl chloride.

(C) Equimolar amounts of 1-aminohexamethyleneimine and urea are heated at about 180–200° C. to yield hexamethyleneiminourea.

(D) By the substitution of 10.1 g. of p-acetylbenzenesulfinyl chloride for the p-methylbenzenesulfinyl chloride and 7.9 g. of hexamethyleneiminourea for the n-butylurea in Example 1, there is obtained 1-(hexamethyleneimino)-3-(p-acetylbenzenesulfinyl)urea.

EXAMPLE 13

*1-n-butyl-3-(p-methylbenzenesulfinyl)urea, potassium salt*

To a stirred, ice-cooled solution of 254 g. of 1-n-butyl-3-p-methylbenzenesulfinyl-urea in 2500 ml. of absolute alcohol, is added, dropwise, a solution of 66 g. of 85% potassium hydroxide in 750 ml. of absolute alcohol. The reaction mixture is then concentrated in vacuo on a water bath maintained at about 50–60° to yield 1-butyl-3-p-methylbenzenesulfinylurea, potassium salt.

As stated hereinbefore, the sulfinylureas of this invention can be converted to the corresponding sulfonylureas. As an illustration of the oxidation procedure by which this can be accomplished, there follows an experiment showing the preparation of 1-n-butyl-3-p-methylbenzenesulfonylurea by the oxidation of 1-n-butyl-3-(p-methylbenzenesulfinyl)urea.

A solution of 59.8 g. of 1-n-butyl-3-p-methylbenzenesulfinyl urea in 2 l. of 1% sodium hydroxide is mixed with 1 l. of 5% potassium permanganate solution and allowed to stand at about 20° C. After 10 minutes, the excess of potassium permanganate is destroyed by the addition of solid sodium sulfite, and the dark green reaction mixture filtered. Acidification of the filtrate then gives 55 g. of colorless product, M.P. 126–128°. On admixture with authentic 1-n-butyl-3-p-methylbenzenesulfonylurea the M.P. remains unaltered at 126–128°.

This invention may be otherwise embodied within the scope of the appended claims.

What is claimed is:

1. A member selected from the group consisting of a compound of the formula:

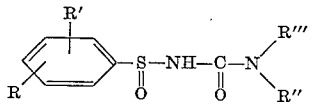

wherein R is lower alkyl, cycloalkyl of less than seven carbon atoms, halogen of atom weight greater than ten, trifluoromethyl, dichloromethyl, nitro, amino, lower alkoxy, and the acyl radical of a hydrocarbon carboxylic acid selected from the group consisting of acetic acid and propionic acid; R' is a member selected from the group consisting of hydrogen, chlorine, bromine, nitro, cyclohexyl, cyclopentyl, amino and lower alkoxy; R'' is a member selected from the group consisting of lower alkyl, cycloalkyl of less than seven carbon atoms and hexamethyleneimino; R''' is a member selected from the group consisting of R'' and hydrogen; and the pharmaceutically acceptable metal salts thereof.

2. 1-lower alkyl-3-(lower alkyl-benzenesulfinyl)urea.

3. 1-lower alkyl - 3 - (trifluoromethyl-benzenesulfinyl) urea.

4. 1-cyclohexyl - 3 - (p-trifluoromethylbenzenesulfinyl) urea.

5. 1-butyl-3-(p-trifluoromethylbenzenesulfinyl)urea.

6. 1-butyl-3-(p-methoxybenzenesulfinyl)urea.

7. 1-lower alkyl-3-(acetylbenzenesulfinyl)urea.

8. 1 - cycloalkyl-3-(acetylbenzenesulfinyl)urea wherein the cycloalkyl is of less than seven carbon atoms.

9. 1-hexamethyleneimino - 3 - (acetylbenzenesulfinyl) urea.

References Cited by the Examiner
UNITED STATES PATENTS
2,968,158  1/1961  Ruschig et al. _____ 260—553

FOREIGN PATENTS
162,888  4/1949  Austria.
201,067  12/1958  Austria.
559,530  9/1957  Belgium.

OTHER REFERENCES
Japanese Patent 36–4720, May 13, 1961, (2 pages specification).

Nitti et al., Pharm. Soc. Japan, vol. 82, pages 967–971 (July 25, 1962).

JOHN D. RANDOLPH, *Primary Examiner.*

IRVING MARCUS, NICHOLAS S. RIZZO, WALTER A. MODANCE, *Examiners.*

E. E. BERG, *Assistant Examiner.*